(12) United States Patent
Deldalle

(10) Patent No.: US 7,895,819 B2
(45) Date of Patent: Mar. 1, 2011

(54) ASSISTANCE AND EMERGENCY BACKUP FOR THE ELECTRICAL DRIVE OF A FUEL PUMP IN A TURBINE ENGINE

(75) Inventor: Regis Michel Paul Deldalle, Servon (FR)

(73) Assignee: Hispano Suiza, Colombes (FR)

( * ) Notice: Subject to any disclaimer, the term of this patent is extended or adjusted under 35 U.S.C. 154(b) by 252 days.

(21) Appl. No.: 12/181,567

(22) Filed: Jul. 29, 2008

(65) Prior Publication Data
US 2010/0003148 A1 Jan. 7, 2010

(30) Foreign Application Priority Data
Jul. 30, 2007 (FR) .................... 07 56796

(51) Int. Cl.
*F02C 9/00* (2006.01)
(52) U.S. Cl. .................... 60/39.281; 60/734; 417/16
(58) Field of Classification Search ............. 60/39.183, 60/39.281, 295, 734, 802; 417/16
See application file for complete search history.

(56) References Cited

U.S. PATENT DOCUMENTS 2,946,190 A    7/1960  Corbett
2,949,731 A *  8/1960  Hambling .................... 60/805
4,391,092 A *  7/1983  Arnett ........................ 60/795
7,040,082 B2 * 5/2006  Bouiller et al. .......... 60/39.183

FOREIGN PATENT DOCUMENTS

| EP | 1 382 817 A1 | 1/2004 |
| FR | 2 704 905 | 11/1994 |
| FR | 2 882 095 | 8/2006 |

* cited by examiner

*Primary Examiner*—Louis Casaregola
(74) *Attorney, Agent, or Firm*—Oblon, Spivak, McClelland, Maier & Neustadt, L.L.P.

(57) ABSTRACT

A system for driving a fuel pump in a turbine engine is disclosed. The system includes an electric motor and a fluid flow assistance unit controlled by a control valve. In the system, the control valve is a regulator valve the opening of which is controlled as a function of information representative of the speed of the pump, and/or the speed of the turbine engine, and/or the flow rate of fuel delivered to the turbine engine. As a result, operating safety of the turbine engine can be increased in the event of the electric motor failing or of its electricity generator failing, and the weight/size/cost ratios of the drive system are improved.

10 Claims, 1 Drawing Sheet

ASSISTANCE AND EMERGENCY BACKUP FOR THE ELECTRICAL DRIVE OF A FUEL PUMP IN A TURBINE ENGINE

The invention relates to operating safety in a turbine engine, in particular for an engine mounted on a flying vehicle and fed with fuel by a pump having a drive system that includes one or more electric motors. The invention also relates to optimizing such a drive system, and in particular it enables its weight/cost/size ratios to be improved.

BACKGROUND OF THE INVENTION

In such a drive system, the electric motor usually acts to regulate the flow rate of fuel, and no additional regulator is provided on the fuel feed line to the turbine engine, since that would be redundant.

Furthermore, in spite of the very great reliability of present-day electrical systems, it is always possible that an electrical failure will occur in flight on the electric motor driving the pump, or indeed on the electricity generator that powers the pump (the assembly constituted by one or more electric motors, and their electricity power supply means being referred to herein as the electrical system).

To mitigate such a possibility, and as described in French patent FR 02/09028, emergency means are provided for backing up the electrical system, such as air turbine assistance means. The drive system thus includes an air turbine that can be fed with a flow of air bled from a compressor of said turbine engine in order to drive said accessory.

In order to be able to use such an air turbine, the drive system includes an on/off valve located in the air supply line upstream from the turbine. Providing the air pressure is sufficient, opening the valve enables the turbine to be set into rotation and thus causes the fuel pump to rotate.

Nevertheless, in the event of a failure of the electrical system, it is the air turbine on its own that drives the fuel pump. Unfortunately, no means are provided for controlling the speed of the air turbine. That is why, under such circumstances, the air turbine, and consequently the fuel pump, are no longer under control, which can lead to problems in piloting the vehicle.

More generally, the present invention relates to a system for driving a fuel pump in a turbine engine, said system comprising an electric motor, an electronic control unit, and fluid flow assistance means controlled by a control valve.

The fluid flow assistance means comprise additional motor means driven by a flow of fluid (pneumatic or hydraulic) suitable for assisting and/or replacing the electric motor(s) for driving the pump.

OBJECT AND SUMMARY OF THE INVENTION

The object of this invention is to remedy the above-mentioned problem by means that are simple, improving the operation of the fuel pump drive system so as to increase the operating safety of the turbine engine in the event of a failure in the electrical system.

According to the invention, this object is achieved by the fact that the control valve is a regulator valve, with the opening thereof being controlled by the electronic control unit as a function of information representative of the speed of rotation of the pump, and/or the speed of rotation of a shaft of the turbine engine, and/or of the flow rate of fuel delivered to the turbine engine.

In known manner, in order to be able to control the operation of a turbine engine, it is necessary to be able in particular to control the rate at which fuel is delivered to the turbine engine.

The way in which this flow rate can be controlled in the drive system of the invention depends on the information that is available for regulating flow.

When the information used for regulation purposes is information representative of the speed of rotation of the pump, then the fluid feed to the assistance means is controlled so as to cause the fuel pump to rotate at the desired speed of rotation, itself determined as a function of the intended speed for the turbine engine.

When the information used for regulation purposes is information representative of the speed of rotation of a shaft of the turbine engine, a fuel flow rate is initially determined as a function of said speed that is assumed to be appropriate for obtaining the desired operating speed of the turbine engine; the fluid feed to the assistance means is then regulated so as to bring the speed of rotation of the fuel pump up to the speed of rotation that delivers fuel at the previously-determined flow rate to the turbine engine.

When the information used for regulating the turbine engine is the flow rate of fuel delivered to the turbine engine, then the fluid feed to the assistance means is regulated so as to bring the speed of rotation of the fuel pump to the speed of rotation that supplies the desired fuel flow rate.

Thus, regulating the fluid feed to the assistance means can be used for bringing the turbine engine to the desired operating speed. More precisely, since the fluid feed is regulated by a regulator valve, i.e. a valve that is progressive (the extent to which the valve is opened can be varied continuously), the turbine engine can genuinely be maintained at the desired speed of rotation, thus making it possible in particular to avoid having to stop the turbine engine, as would be necessary if it were being fed with fuel in a manner that did not make it possible to take account of other operating parameters (airplane speed, air temperature and pressure, etc.).

It should be observed that the three variables used as input data for this regulation correspond to one another and are all representative to a varying extent of the speed of the engine, which is the magnitude that it is desired to regulate: the speed of a shaft of the turbine engine is directly representative of said speed; the flow rate of fuel delivered to the turbine engine is a magnitude that is very closely correlated with engine speed; and finally going further upstream in the fuel feed system, the speed of rotation of the fuel pump nevertheless remains an indicator that is closely correlated with engine speed.

This solution has the advantage of being technically very simple, since the rate at which fuel is delivered by the pump can be regulated merely by a regulator valve, and on the basis of one or more items of information that are commonly available in a flying vehicle, namely said information representative of the speed of rotation of the pump, and/or the speed of rotation of the turbine engine, and/or the fuel flow rate delivered to the turbine engine.

Advantageously, the fluid flow assistance means is an air turbine or some other pneumatic or hydraulic actuator, suitable for being operated in the event of the electrical system failing.

In particular, when the assistance means is an air turbine, it is possible to regulate the air turbine by modulating its air feed rate by means of a regulator valve such as a butterfly valve.

BRIEF DESCRIPTION OF THE DRAWING

Other advantages and characteristics of the invention appear on reading the following description made by way of example and with reference to the accompanying drawing in which.

MORE DETAILED DESCRIPTION

Figure 1:
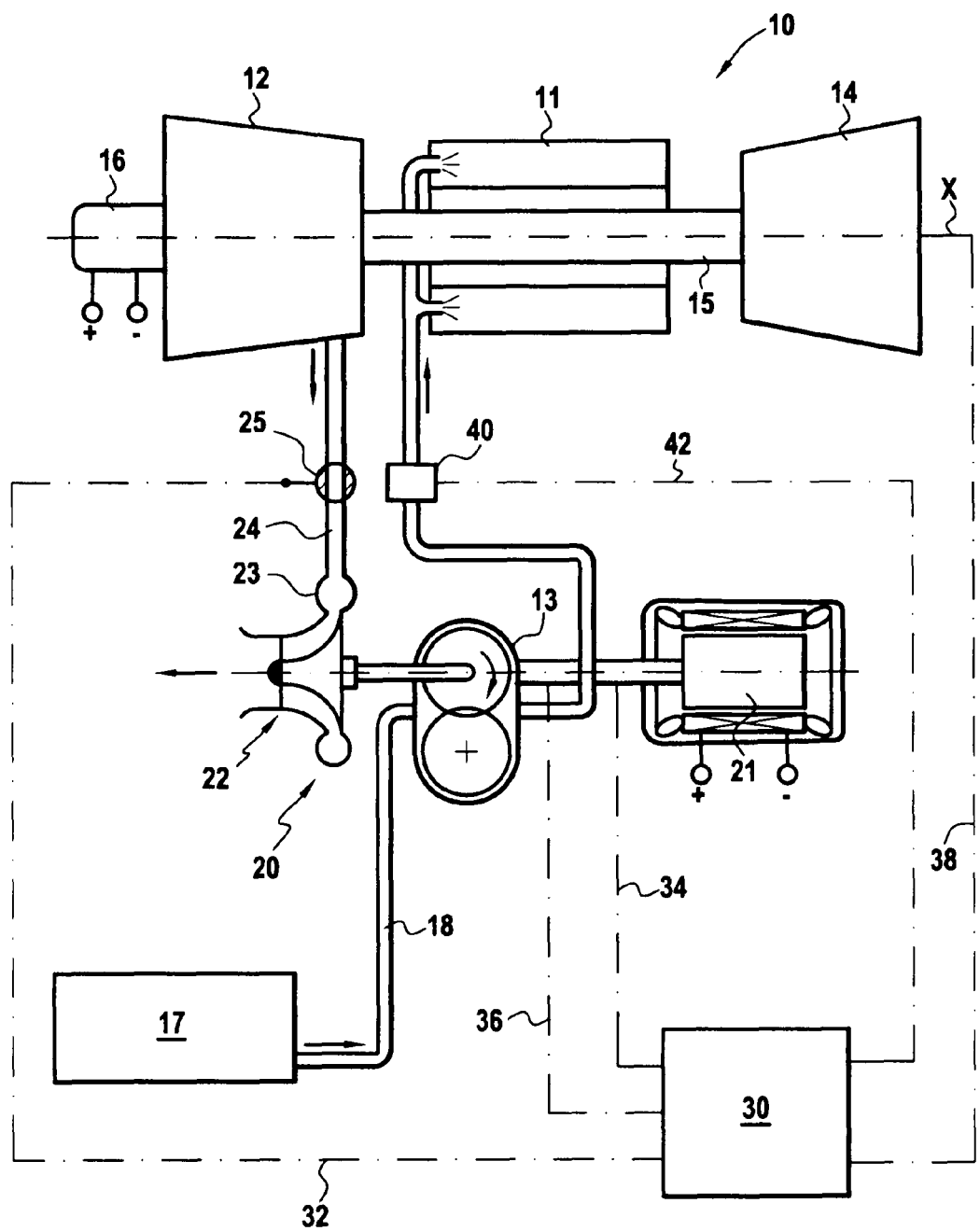
FIG. 1 is a diagram showing the principle of a turbine engine of the "all electric" type having a fuel pump drive system in accordance with the invention.

With reference to this figure, there follows a description of a turbine engine 10 of axis X and including a drive system of the invention for its fuel pump 13.

The turbine engine 10 is "all electric" and comprises a combustion chamber 11 fed with air by a compressor 12 and with fuel by a fuel pump 13. The hot gas coming from the combustion chamber 11 drives a turbine 14 that is connected to the compressor 12 by a shaft 15. The turbine engine 10 is also fitted with an incorporated starter-generator 16 on the axis X located in the cold zones of the compressor 12. Reference 17 designates a fuel tank that is connected to the pump 13 by a duct 18.

The fuel pump 13 is driven by a drive system 20 comprising firstly an electric motor 21 and secondly an air turbine 22 that is preferably on the same axis as the electric motor 21, having its inlet tube 23 connected to the compressor 12 by an air bleed duct 24 with a two-port regulator valve 25 interposed therein (i.e. a valve that varies progressively), the duct 24 serving to feed the fluid flow assistance means, here the air turbine, with fluid.

The fuel pump feeds the turbine engine via a pipe that includes a flow meter 40 that measures the flow rate of fuel delivered to the turbine engine.

Advantageously, the regulator valve 25 is controlled by an electronic control unit 30 (or "Fadec"), that receives and processes information representative of the speed of the pump 13, or of a shaft of the turbine engine 10, or of the flow rate of fuel delivered to the turbine engine, as mentioned above.

The drive system 20 operates as follows:

When starting the turbine engine 10, the regulator valve 25 is in its closed position. The starter-generator 16 is in its starter configuration and is electrically powered by an auxiliary power unit (not shown in the drawing). The electric motor 21 is also powered by the auxiliary power unit during starting. The rotor of the turbine engine 10 begins to rotate at ignition speed and the combustion chamber 11 is fed with air by the compressor 12. Fuel is then injected into the combustion chamber 11 by the fuel pump 13 under drive from the electric motor 21 under the control of the electronic control unit 30. Once ignition has occurred, the starter-generator 16 is put into its electricity generator configuration. Once idling speed has been reached, the generator 16 delivers enough electricity to power the electric motor 21 that drives the fuel pump 13 and the electric motors that drive other accessories, so as to maintain the turbine engine 10 at steady speed independently and without help from the auxiliary power unit.

The valve 25 for regulating the flow rate of air bled from the compressor 12 under the control of the electronic control unit 30 is then opened so that the air turbine 22 delivers additional mechanical drive to the fuel pump 13 under all flying conditions.

Thus, as from this moment, the air turbine is used together with the electric motor for driving the fuel pump.

Besides, it is advantageous for the air turbine to be suitable for driving the fuel pump in the event of a lack of electrical power supply or in the event of a failure of said electric motor 21.

In other words, the air turbine 22 is dimensioned so that in the event of the generator 16 or the electric motor 21 failing, it is capable on its own of delivering sufficient emergency power to drive the fuel pump 13 so as to enable the airplane or the vehicle fitted with the turbine engine 10 to continue flying or return to base, even at low speed.

In order to enable operation in such a degraded mode, the drive system 20 also includes a connection 34 enabling the electronic control unit 30 to detect a breakdown of the electric motor, e.g. by measuring the speed of the outlet shaft from the electric motor.

The electronic control unit 30 also has connections 36, 38, and 42 via which it receives information representative respectively of the speed of rotation of the pump, or of a shaft of the turbine engine 10, or of the flow meter 40. By means of this information, the electronic control unit 30 generates the signal for controlling the regulator valve 25, as specified above, in particular in the event of the electric motor 21 or the electricity generator 16 failing. This signal can then be communicated to the regulator valve 25 via a connection 32.

In the system shown in FIG. 1, the three items of information concerning the speed of rotation of a shaft of the engine, the speed of rotation of the pump, and the flow rate of fuel delivered to the turbine engine, are measured and transmitted to the electronic control unit 30 to enable it to generate the signal for controlling the regulator valve 25.

More generally, it suffices to have any one or two of these items of information in order to be able to generate an effective control signal.

Finally, during stages in which the vehicle fitted with the turbine engine is taking off or even climbing, the hydraulic power consumed by the pump may be two to three times greater than during other flying conditions.

Advantageously, the extra power delivered by the fluid flow assistance means for driving the fuel pump is preponderant during these stages of flight. Thus, the electric motor may conserve dimensions that are relatively modest, with a major portion of the power being delivered by the fluid flow assistance means. This leads to a reduction in the weight of the fuel pump drive system.

In particular, it is possible to have an electric motor of maximum power that remains less than the power consumed by the pump, or even less than 50% thereof. Under such circumstances in particular, the electric motor is not capable on its own of driving the fuel pump during takeoff, which always requires assistance from the fluid flow assistance means; in other words, the combined power of the electric motor plus the fluid flow assistance means is necessary during takeoff.

What is claimed is:

1. A system for driving a fuel pump in a turbine engine, said system comprising:
an electric motor;
an electronic control unit; and
fluid flow assistance means controlled by a control valve, said fluid flow assistance means including additional motor means driven by a flow of fluid and suitable for at least one of assisting or replacing the electric motor,
wherein the control valve is a regulator valve, with a progressively variable opening thereof being controlled by the electronic control unit as a function of information representative of at least one of a speed of rotation of the pump, a speed of rotation of a shaft of the turbine engine, or a flow rate of fuel delivered to the turbine engine.

2. The drive system according to claim 1, wherein the assistance means comprise an air turbine.

3. The drive system according to claim 2, wherein the air turbine can be operated together with the electric motor for driving the fuel pump.

4. The drive system according to claim 2, wherein the air turbine is suitable for driving the fuel pump in the event of an electricity power supply failing or in the event of said electric motor failing.

5. The drive system according to claim 2, wherein said regulator valve is situated on the fluid feed to the air turbine.

6. The drive system according to claim 1, wherein a maximum power of the electric motor is less than a maximum power that can be drawn by the pump.

7. The drive system according to claim 6, wherein the maximum power of the electric motor is less than 50% of the maximum power that can be drawn by the pump.

8. A turbine engine including a drive system according to claim 1.

9. The drive system according to claim 1, wherein the regulator valve is a two-port valve.

10. The drive system according to claim 1, wherein the electronic control unit receives the flow rate of fuel delivered to the turbine engine from a flow meter.

* * * * *